(12) United States Patent
Merrill

(10) Patent No.: US 11,312,176 B2
(45) Date of Patent: Apr. 26, 2022

(54) WHEEL ASSEMBLY FOR VEHICLE WHEEL ADJUSTMENT HAVING HUB WITH TWO PORTS

(71) Applicant: Compagnie Generale des Etablissements Michelin, Clermont-Ferrand (FR)

(72) Inventor: Zachary Alexander Merrill, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 306 days.

(21) Appl. No.: 16/608,303

(22) PCT Filed: May 31, 2017

(86) PCT No.: PCT/US2017/035162
§ 371 (c)(1),
(2) Date: Oct. 25, 2019

(87) PCT Pub. No.: WO2018/222183
PCT Pub. Date: Dec. 6, 2018

(65) Prior Publication Data
US 2020/0055334 A1 Feb. 20, 2020

(51) Int. Cl.
*B60B 27/02* (2006.01)
*B60B 27/00* (2006.01)
(Continued)

(52) U.S. Cl.
CPC .......... *B60B 27/02* (2013.01); *B60B 27/0073* (2013.01); *B60B 7/066* (2013.01);
(Continued)

(58) Field of Classification Search
CPC ..... B60B 27/02; B60B 27/0073; B60B 7/066; B60B 7/14; B60B 2900/511;
(Continued)

(56) References Cited

U.S. PATENT DOCUMENTS

| 1,823,422 A | 9/1931 | Bock |
| 2,249,501 A | 7/1941 | Teker |

(Continued)

FOREIGN PATENT DOCUMENTS

| CN | 203004967 U | 6/2013 |
| CN | 204082953 U | 1/2015 |

(Continued)

OTHER PUBLICATIONS

European Patent Office; International Search Report and Written Opinion for patent application PCT/US2017/035162 filed May 31, 2017; Publisher: European Patent Office, Rijswijk, Netherlands, dated Jan. 29, 2018; pp. 1-10, enclosed.

*Primary Examiner* — Kip T Kotter
(74) *Attorney, Agent, or Firm* — Neal P. Pierotti

(57) ABSTRACT

An apparatus for a vehicle is provided that has an axle and a spindle sleeve with a spindle sleeve inner surface axis coaxial with the axis of the axle, and a spindle sleeve outer surface axis not coaxial with the axis of the axle. A hub has an axis coaxial with the spindle sleeve outer surface axis, and the hub at least partially defines a chamber. First and second ports extend through a wall of the hub to the chamber. The hub rotates about the spindle sleeve through the aid of two bearings. Lubricant is present within the chamber, and the first port provides a pathway for a pressurized fluid to be introduced into the chamber to force the lubricant out of the chamber via the second port.

10 Claims, 4 Drawing Sheets

(51) Int. Cl.
    *B60B 7/06*           (2006.01)
    *B60B 7/14*           (2006.01)

(52) U.S. Cl.
    CPC ............ *B60B 7/14* (2013.01); *B60B 2900/511* (2013.01); *B60B 2900/561* (2013.01)

(58) Field of Classification Search
    CPC ........ B60B 2900/561; B60B 2900/321; B60B 35/004; B60G 2200/46; B60G 2200/462; B60G 2200/4622; B60G 2204/61; B60G 2206/50; B60G 2206/99; B60G 9/00; F16C 33/6622
    See application file for complete search history.

(56) References Cited

U.S. PATENT DOCUMENTS

| | | |
|---|---|---|
| 2,337,403 A | 12/1943 | Meyers |
| 5,964,325 A | 10/1999 | Davison |
| 8,652,021 B2 | 2/2014 | Yumoto |
| 8,753,016 B2 | 6/2014 | Matsuyama |
| 9,077,222 B2 | 7/2015 | Makino |
| 10,272,729 B2 * | 4/2019 | Merrill .................... B60B 27/02 |
| 10,363,962 B2 * | 7/2019 | Merrill .................... F16D 65/09 |
| 2008/0024003 A1 | 1/2008 | White |
| 2017/0247055 A1 * | 8/2017 | Merrill ................... B60G 9/003 |

FOREIGN PATENT DOCUMENTS

| | | | |
|---|---|---|---|
| CN | 015179906 A | 12/2015 | |
| EP | 2896843 A1 | 7/2015 | |
| JP | 11257855 A * | 9/1999 | ......... F16C 33/6622 |
| JP | 11257855 A | 9/1999 | |
| RU | 118254 U1 | 7/2012 | |
| WO | WO-2008014365 A1 * | 1/2008 | ............ F16C 33/581 |
| WO | WO-2016080966 A1 * | 5/2016 | ........... B60B 35/009 |

\* cited by examiner

WHEEL ASSEMBLY FOR VEHICLE WHEEL ADJUSTMENT HAVING HUB WITH TWO PORTS

CROSS-REFERENCE TO RELATED APPLICATION

The present application is a 35 U.S.C. § 371 application of PCT/US17/35162 filed on May 31, 2017 and entitled "Wheel Assembly For Vehicle Wheel Adjustment Having Hub With Two Ports." PCT/US17/35162 is incorporated by reference herein in its entirety for all purposes.

FIELD OF THE INVENTION

The subject matter of the present invention relates to wheels that include a device with a spindle sleeve for imparting camber and/or toe to the wheel hub of the vehicle. More particularly, the present application involves a hub, in such a wheel assembly, that features a pair of ports that facilitate the removal of lubrication present within the assembly when maintenance or disassembly is desired.

BACKGROUND OF THE INVENTION

The alignment of a vehicle's wheel plane relative to the path traveled by the vehicle affects not only the handling of the vehicle but also affects the wear on the tires. As used herein, alignment refers to camber, toe, and thrust. Camber is the angle between the vertical axis of the wheel and the vertical axis of the vehicle. Positive camber refers to an angle where the top of the wheel is farther away from the center of vehicle than the bottom of the wheel. Negative camber refers to an angle where the bottom of the wheel is farther away from center of the vehicle than the top. Generally speaking, camber changes of even a fourth of one degree can impact tire wear. Abnormal tire wear has been observed in certain applications with even smaller camber angles changes. Toe is the angle each wheel makes with the longitudinal axis of the vehicle. Positive toe, also referred to as toe in, is a condition where the front of the wheel is pointing in or towards the center line of the vehicle. Negative toe, also referred to as toe out, is a condition where the front of the wheel points out or away from the center line of the vehicle. Generally speaking, toe changes of even one-tenth of a degree can have an impact on tire wear. Thrust is the resulting direction of travel of an axle as opposed to the direction that might be expected from the orientation of the tires on the axle.

The wheel assembly includes a hub that is mounted onto an axle of the vehicle and rotates thereon by inclusion of a pair of bearings. The wheel assembly will include a chamber into which lubrication is inserted to keep the bearings and other components lubricated during use. Over time, the bearings or other components may need to be replaced. Opening up the assembly will create a mess as the lubrication will seep or spill out when the parts are disassembled and the integrity of the chamber containing the lubrication is compromised. The lubrication is semi-fluid grease, but other lubrication is possible such as oil, and this fluid will make a mess when the assembly is opened. The lubrication will be lost and can create an environmental impact, thus increasing the time, cost, and difficulty of the maintenance. Semi-fluid grease is unhygienic and unpopular to use because the ability of semi-fluid grease to drain is low, and this material when used as the lubricant will make a horrible mess when the hub is removed and components disassembled. As such, there remains a need for removing lubricant from an assembly during maintenance of a wheel hub that is environmentally friendly, easy, and that reduces costs of the maintenance.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is an exploded assembly perspective view of an apparatus that includes a spindle, spindle sleeve, hub with ports, bearings, and a brake mounting plate.

FIG. 2 is a cross-sectional view of the spindle sleeve taken along line 2-2 in FIG. 1.

FIG. 3 is a cross-sectional view of the assembly in an operational state with the ports closed.

FIG. 4 is a cross-sectional view of the assembly with the ports open and lubrication being flushed from a chamber of the assembly.

The use of identical or similar reference numerals in different figures denotes identical or similar features.

DETAILED DESCRIPTION OF THE INVENTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The following terms are defined as follows for this disclosure:

"Axial direction" refers to a direction parallel to the axis of rotation of for example, the hub or the wheel as it travels along a road surface.

"Radial direction" refers to a direction that is orthogonal to the axial direction and extends in the same direction as any radius that extends orthogonally from the axial direction.

"Toe" means the angle of the equatorial plane of the tire with respect to the longitudinal axis of the vehicle.

"Camber" means the angle of the equatorial plane of the tire with respect to the vertical axis of the vehicle.

"Vehicle" includes motorized vehicles and non-motorized vehicles including trailers.

An apparatus 10 is provided that may include a wheel hub assembly that includes an alignment correction spindle sleeve 68, bearings 60, 116, and a chamber 136 into which lubricant 130 is located. A hub 76 has a first port 132 and a second port 134 disposed through a wall of the hub 76 and in communication with the chamber 136. When maintenance on the apparatus 10 is desired, the lubricant 130 may be removed from the chamber 136 through the application of pressure through the first port 132 that causes the lubricant 130 to be pushed through the second port 134 to be removed from the chamber 136 and received within a collection vessel 138. The removal of lubricant 130 promotes a faster and more economical and environmentally friendly repair and maintenance of the apparatus 10. Less mess is produced in the opening of the apparatus 10, and the lubricant 130 may be captured for reuse or proper disposal.

Figure 1:
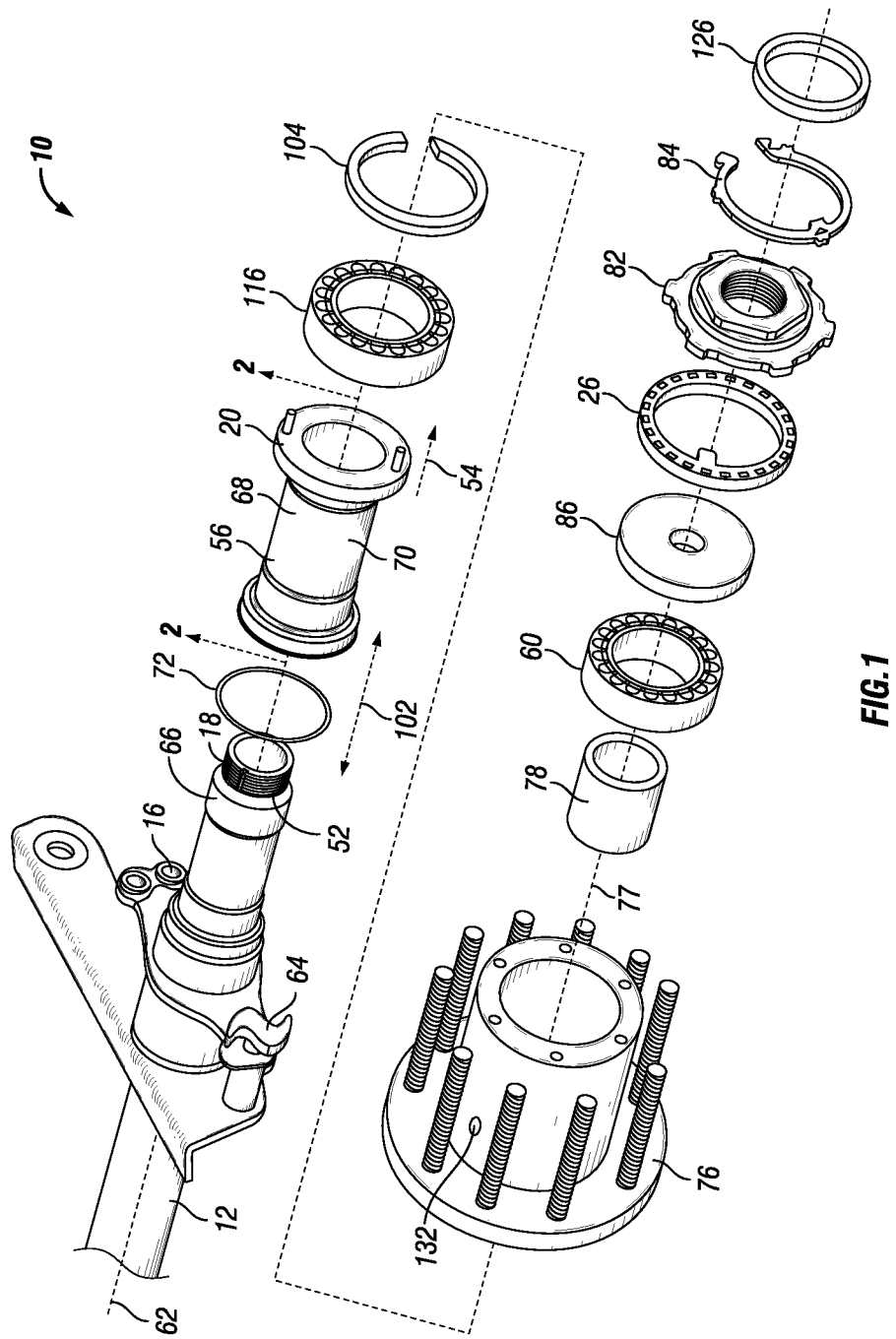

FIG. 1 provides an embodiment of an apparatus for adjusting the alignment of the axis of rotation of a hub 76 relative to a spindle 66 attached at the end of an axle 12. The spindle 66 is a portion of the axle 12 and may be integrally formed with the axle 12 or a separate piece carried on the axle 12. The hub 76 is retained on the axle 12 usually by way of an axle nut, also referred to as a spindle nut 82, which engages a threaded end of the spindle 66. In this particular embodiment, the spindle 66 and hub 76 are typical to what may be observed on a heavy vehicle such as a truck trailer, but it should be understood that the invention disclosed could be used with other vehicle types.

Figure 2:
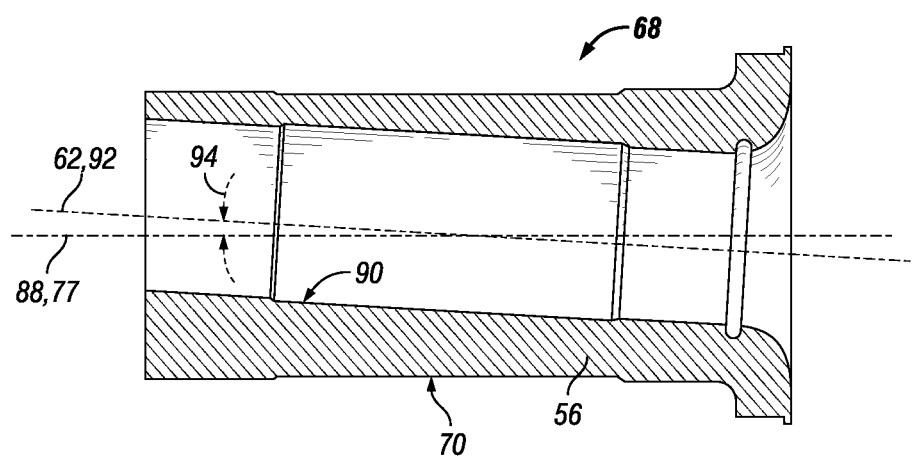

The spindle 66 has an outer surface of revolution centered upon an axis 62 of the axle 12. The spindle 66 can be mounted to the axle 12 in a variety of manners in accordance with various exemplary embodiments. One mechanism of adjusting axial alignment involves a system that includes a spindle sleeve 68 that has an outer surface 70 about a first axis of revolution and an inner surface 90 about a second axis of revolution at an angle to the first axis. The predetermined angle may be in a vertical direction to induce a change in camber, in a horizontal direction to induce a change in toe, or a combination thereof. A spindle sleeve 68, shown in cross-section in FIG. 2, possessing a spindle sleeve inner surface 90 is machined to a diameter so as to fit over the outer surface of the spindle 66. The spindle sleeve inner surface 90 is a generally cylindrical surface of revolution about a spindle sleeve inner surface axis 92. When the spindle sleeve 68 is mated with the spindle 66, the spindle axis which is the same as the axis 62 of the axle 12 and the spindle sleeve inner surface axis 92 are positionally and angularly aligned to one another such that the axes 62, 92 are geometrically the same and are coaxial.

The spindle sleeve 68 has a body 56 and possesses a spindle sleeve outer surface 70 with an outer surface of revolution about a spindle sleeve outer surface axis 88 which is oriented at a predetermined angle and position relative to the spindle sleeve inner surface axis 92. In this regard, the spindle sleeve outer surface axis 88 and the spindle sleeve inner surface axis 92 are oriented at an angle 94 to one another. This predetermined angle 94 may be in a vertical direction (inducing a positive or negative change in camber) or horizontal direction (inducing a positive or negative change in toe) or a combination thereof (inducing a positive or negative change in camber and inducing a positive or negative change in toe). It should be appreciated that the value of the difference in angle between the spindle sleeve outer surface axis 88 and the spindle sleeve inner surface axis 92 may be nonzero when viewed in a particular direction. For example the difference in angle may be zero in the horizontal where no change in toe is occurring while having a positive or negative change in angle in the vertical direction where a change in camber is occurring. The angle between the spindle sleeve inner surface axis 92 and the spindle sleeve outer surface axis 88 is chosen depending upon the desired adjustment of the camber, toe and thrust angle of the hub 76 (and attached wheel).

The vertical and horizontal placement and the angular alignment of the spindle sleeve outer surface axis 88 relative to the spindle sleeve inner surface axis 92 is limited to the thickness of the spindle sleeve 68 walls. The walls must be sufficiently thick so as not to deform during handling of the spindle sleeve 68, installation of the spindle sleeve 68 upon the spindle 66, or operation of the vehicle as the loads are transmitted from the vehicle through the spindle 66, spindle sleeve 68, wheel bearings, hub 76 and to the road surface.

With reference back to FIG. 1, the hub 76 is rotationally mounted onto the exterior surface of the spindle sleeve 68. This rotational mounting may be accomplished by the use of one or more bearings between the hub 76 and the spindle sleeve 68 in the radial direction. The bearing arrangement can include bearings 60, 116 on the spindle sleeve outer surface 70 and spaced from one another a distance in the axial direction of the spindle sleeve inner surface axis 92 by a bearing spacer 78. A containment seal 86 can engage and be located outboard from the bearing 60. A seal 72 may be pressed on the inboard portion of the spindle sleeve 68 and inboard portion of the hub 76 and can be disposed between and contact these two elements 68, 76 to prevent fluid from flowing past this connection. The seal 72 illustrated is a unitized type seal, but other seal types are possible such as non-unitized positive contact lip seals. Other components can be included in the bearing arrangement, and the hub 76 can be placed into rotating engagement with the spindle sleeve 68 in a variety of manners in accordance with other exemplary embodiments.

The spindle 66 may be welded to an end of an axle tube of the axle 12 and when the suspension system is unloaded, the axes of the spindles 66 on each side are aligned and have zero degrees of camber and zero degrees of toe. The vehicle dynamics and loads placed upon the axle 12 by the vehicle weight and cargo deflect the axle 12 causing the spindles 66 to take on a small amount of camber. The spindle sleeve 68 allows adjustment of the wheel camber, toe and thrust angles by a desired amount.

A keyway 18 may be positioned on the rear end of the axle 12 and may extend into a spindle wall portion and may extend in length in the direction of the axis 62. The keyway 18 allows a spindle nut lock ring 84 to prevent the spindle nut 82 from rotating relative to the spindle 66. The spindle nut 82 shown here is a locking spindle nut having a spindle nut lock ring 84. Other spindle nuts 82 may be used, including a castle nut, a nut and retaining washer, or dual nut and a lock plate. It should also be understood that such spindle nuts may work in conjunction with a cotter pin inserted through an aperture on the spindle 66 instead of a keyway as described. The wheel assembly also includes a pair of brake pin apertures 16 for mounting brake frictional components thereon that are actuated by the cam 64 in order to engage the hub 76 for braking. When the angle of the camber and toe is changed, the angle that the brake components attached to the axle 12 changes with respect to the brake components attached to the hub 76. The axis 77 of the hub 76 is aligned with the spindle sleeve outer surface axis 88 so that these two axes 77, 88 are at an angle to the axis 62 of the axle 12. Adjustments may be made to ensure the brake components properly align with one another due to the misalignment of the axis 62 and axis 77.

The spindle sleeve 68 may include a sleeve washer 20 located at its terminal end in the outboard direction 54 of the lateral direction 102. The sleeve washer 20 extends beyond a body 56 of the spindle sleeve 68 in the radial direction. The sleeve washer 20 may be a separate piece that is subsequently attached to the body 56. A pair of pins can extend from the sleeve washer 20 in the outboard direction 54 and may be the portions of the spindle sleeve 68 located most outboard in the outboard direction 54. A lock plate 26 is shown in FIG. 1 that has a pair of pin apertures (not shown) that extend part way through the lock plate 26 and are oriented 180 degrees to one another. The pin apertures are complimentary to the pins of the sleeve washer 20 and receive them within. The lock plate 26 also has a lock plate tab that extends into the central aperture of the lock plate 26.

Disposed around the entire circumference of the lock plate 26 is a series of lock plate apertures that are through apertures of the lock plate 26.

A series of lock ring apertures can extend through a flange of the spindle nut 82 and may be evenly spaced. The spindle nut 82 and lock plate 26 may be placed into rotational communication with one another. A lock plate aperture of the lock plate 26 can be aligned with a lock ring aperture, and a spindle nut lock ring 84 may be located within a groove of the spindle nut 82, and a spindle nut lock ring 84 can be inserted through the aligned lock plate apertures to cause rotation of the spindle nut 82 to be translated to the lock plate 26.

Figure 3:
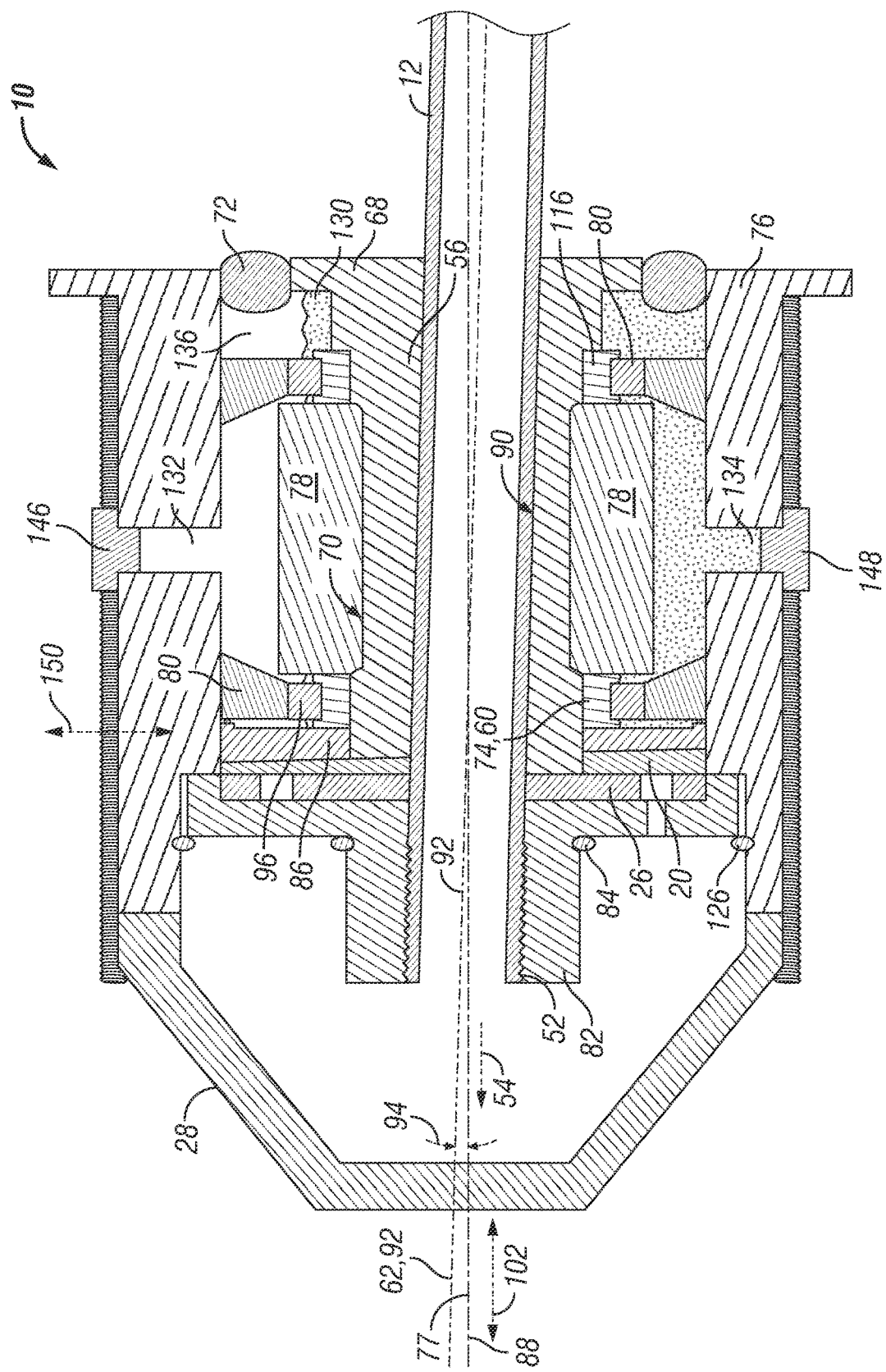

The apparatus 10 may include a retainer that is a single component that has a consistent cross-sectional shape that extends about an axis so that an aperture is defined through the center of the retainer 104. The retainer 104 can extend in a circular shape about its axis, but may not extend all the way around so that it extends some amount less than 360 degrees about its axis. The retainer 104 may be placed within a groove on the spindle sleeve outer surface 70. A cross-sectional view of an assembly of the apparatus 10 is illustrated in FIG. 3, although the retainer 104 is not illustrated in this figure. The hub 76 may come pre-packaged with components of the apparatus 10 such as the spindle sleeve 68, lock plate 26, spindle nut 82, bearing spacer 78, retainer 104, and bearings 60 and 116. As the spindle sleeve 68 needs to be appropriately radially located on the axle 12, and as the spindle sleeve 68 may be inaccessible due to its location within the hub 76, a means of rotating the spindle sleeve 68 relative to the axle 12 is provided. Rotation of the spindle nut 82 will be transmitted to the lock plate 26 as previously discussed to cause rotation of the spindle sleeve 68. The retaining nut 24 is accessible outside of the hub 76, although the spindle sleeve 68 may not be accessible in the same manner.

Bearing 60 has an inner race 74 that engages the spindle sleeve 68 and the sleeve washer 20. The outer race 80 of the bearing 60 engages the hub 76, and a roller 96 of the bearing 60 is located between and engages both the inner race 74 and the outer race 80. The retainer 104 is located in the groove and extends from the groove outward in the radial direction. When the hub 76 and associated components are removed from the axle 12, the inner race 74 moves forward slightly in the lateral direction 102 and engages the retainer 104 so that all of the components can be removed as a single unit to prevent some of them from remaining on the axle 12. The spindle sleeve 68 is removed from the axle 12 at the same time as other components so that they are removed as a single unit. Taking off the spindle nut lock ring 84 removes rotation communication to the spindle sleeve 68 so that rotation of the spindle nut 82 causes internal threading of the spindle nut 82 to engage external threading 52 to cause the axle 12 to move outboard relative to the hub 76 and other components.

A nut retainer ring 126 is disposed within an internal notch of the hub 76. As the spindle nut 82 is moved in the outboard direction 54 via turning on the threaded end of the axle 12, the spindle nut 82 engages the nut retainer ring 126 and forces it in the outboard direction 54. This in turn causes a force in the outboard direction 54 to be imparted onto the hub 76 to likewise cause the hub 76 to move in the outboard direction 54 as the spindle nut 82 is unthreaded from the axle 12. Continued rotation likewise causes the lock plate 26 and the spindle sleeve 68 to tighten together and move inboard in the lateral direction 102. Once the spindle nut 82 has been tightened into its secured position, the spindle nut lock ring 84 can be reinserted to function to prevent the spindle nut 82 from backing off of the axle 12 and loosening the connection as may occur from driving forces imparted by the vehicle's travel.

A hubcap 28 may be located onto the hub 76 and secured thereon through the use of bolts or other fasteners. A gasket may be present at the interface between the hubcap 28 and the hub 76 to help seal this connection, and the hubcap 28 may function to keep debris out of portions of the apparatus 10 such as the axle 12, the spindle nut 82, and the space sealed by the containment seal 86. The hubcab 28 is not an air tight or gas tight seal but instead functions to keep dirt, dust and debris from interior portions of the apparatus 10.

A chamber 136 is defined in the apparatus 10 by one or more of the components of the apparatus 10. As shown in FIG. 3, the chamber 136 is a space within the apparatus 10 that is defined by the inner wall of the hub 76, the spindle sleeve outer surface 70, the containment seal 86, and the seal 72. Other components could define the chamber 136 in other embodiments. The lubricant 130 is located within the chamber 136 and functions to lubricate the bearings 60, 116, and any other rotating, sliding, or moving components of the apparatus 10. The lubricant 130 usually is not provided so as to fill the entire chamber 136, but only fills a portion of the chamber 136 to allow for expansion of gases and lubricant 130 within the chamber 136 when the apparatus 10 becomes hot after use. A first port 132 extends completely through the wall of the hub 76 and a plug 146 fills the first port 132 to prevent the lubricant 130 from escaping. In some embodiments, the plug 146 may have a vent feature that allows hot gases within the chamber 136 to vent to the atmosphere to cause pressure within the chamber 136 to be relived during use.

The hub 76 also has a second port 134 that extends completely through the wall of the hub 76 to place the chamber 136 into communication with the atmosphere. A plug 148 can close the second port 134 to prevent the lubricant 130 from escaping, and in some embodiments the plug 148 may have a vent or other feature that allows gases within the chamber 136 to be vented to relive pressure within the chamber 136 during use of the apparatus 10.

The apparatus 10 can be provided with the lubricant 130 prefilled into the chamber 136 so that the user does not have to fill the chamber 136. Alternately, the lubricant 130 may be filled into the chamber 136 by the user in some embodiments, and the apparatus 10 need not be prepackaged. After the apparatus 10 is used it will eventually require maintenance such as the replacement of bearings 60, 116 or other components. In order to prevent the lubricant 130 from being lost and to reduce mess and cost of the maintenance procedure, the lubricant 130 may be expelled from the chamber 136 before the hub 76 is removed from the axle 12, or before the integrity of the chamber 136 is breached. The lubricant 130 that is included can be any type of lubricant. For example, the lubricant 130 may be oil, grease, semi-fluid grease, or a synthetic semi-fluid grease in certain exemplary embodiments. The expulsion of the lubricant 130 may be conducted before the hubcap 28 is removed, or before the spindle nut lock ring 84 is taken off, or before the spindle nut 82 is rotated. Although some disassembly may occur, in some embodiments, the first step in the maintenance procedure is the expulsion of the lubricant 130, and this step may take place before any portion of the apparatus 10 is disassembled such as the hubcap 28, spindle nut lock ring 84, spindle nut 82, or hub 76.

Figure 4:
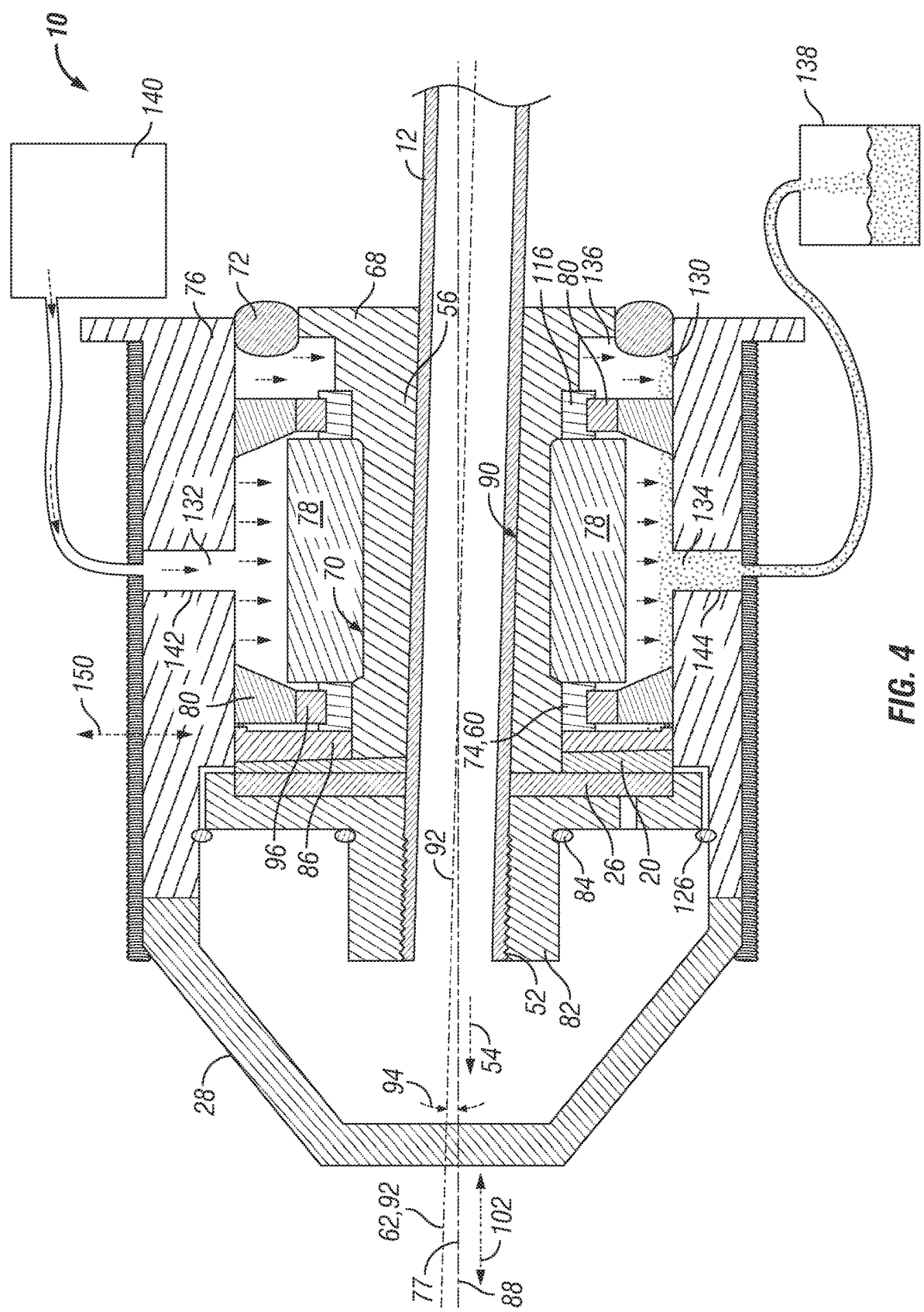

FIG. 4 shows the evacuation procedure of the lubricant 130. The plug 146 is removed from the first port 132, and a fitting 142 is inserted into the first port 132. A pressure source 140 is attached to the fitting 142 and is in communication with the chamber 136. Plug 148 is likewise removed, and a fitting 144 is inserted into the second port 134. A collection vessel 138 is in communication with the chamber 136 through the fitting 144. A pressure is applied to the chamber 136 by the pressure source 140, and this pressure forces the lubricant 130 out of the chamber 136 and through the fitting 144 and into the collection vessel 138. The pressure source 140 can supply a pressurized fluid to the chamber 136, and this pressurized fluid may be air or nitrogen in accordance with different exemplary embodiments. The apparatus 10 can be arranged so that the first port 132 is above the second port 134 in the vertical direction 150 so that the first port 132 is higher than the second port 134. The increased cavity pressure may be applied above the level of the lubricant 130. In some embodiments, the first port 132 is located 180 degrees from the second port 134 on the hub 76 about the hub axis 77. However, in other arrangements, the ports 132, 134 need not be oriented in this manner, and the port that is pressurized need not be located above the port that is not pressurized in order to remove the lubricant 130. The collected lubricant 130 may be reused or may be disposed of without excess damage to the environment. The parts of the apparatus 10 may then be disassembled, if not already, such that the hub 76 can then be removed from the axle 12, and the bearings 60, 116 may then be removed from the axle 12 and/or spindle sleeve 68 and replaced or repaired. The previous removal of the lubricant 130 will make the maintenance easier, less costly, less messy, and with less environmental impact.

Although described as being incorporated into a hub 76 prepackaged with the spindle sleeve 68, bearings 60 and 116, retainer 104, and spindle nut 82, it is to be understood that the apparatus 10 provided may be used in assemblies that are not prepackaged in accordance with other exemplary embodiments. Further, although described as incorporating various components such as the lock plate 26, retainer 104, sleeve washer 20, nut retainer ring 126, just to name a few, it is to be understood that other versions of the apparatus 10 are possible in which these or other various components are not present in the apparatus 10.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus for a vehicle, comprising:
an axle, wherein the axle has an axis;
a spindle sleeve with a spindle sleeve inner surface axis that is coaxial with the axis of the axle, wherein the spindle sleeve has a spindle sleeve outer surface axis that is not coaxial with the axis of the axle, wherein the spindle sleeve has an inner surface and an outer surface;
a hub that has a hub axis that is coaxial with the spindle sleeve outer surface axis, wherein the hub at least partially defines a chamber, wherein the hub has a first port that extends through a wall of the hub to the chamber, wherein the hub has a second port that extends through the wall of the hub to the chamber;
a first bearing;
a second bearing, wherein the first bearing and the second bearing render the hub rotatable with respect to the spindle sleeve;
lubricant that is present within the chamber, wherein the first port provides a pathway for a pressurized fluid to be introduced into the chamber to force the lubricant out of the chamber via the second port;
a spindle nut that engages the axle, wherein the spindle nut is located outboard in a lateral direction from the first bearing and the second bearing;
a bearing spacer that is located between the first bearing and the second bearing in the lateral direction;
wherein the pressurized fluid is introduced into the chamber and the lubricant is forced out of the chamber when the spindle nut engages the axle and when the bearing spacer is located between the first bearing and the second bearing and when the hub engages the first bearing and the second bearing;
a lock plate that has an axis that is coaxial with the hub axis, wherein the lock plate engages the spindle nut and wherein the axle is disposed through the lock plate;
a sleeve washer that engages the lock plate and that is inboard of the lock plate in the lateral direction, wherein the axle is disposed through the sleeve washer;
a containment seal that engages the sleeve washer and that is located inboard of the sleeve washer in the lateral direction, wherein the axle is disposed through the containment seal;
a nut retainer ring that is located within a groove of the hub and engages the hub, wherein the nut retainer ring engages the spindle nut, and wherein outboard movement in the lateral direction of the spindle nut is translated to the nut retainer ring to cause the nut retainer ring to move outboard in the lateral direction to cause the hub to move outboard in the lateral direction;
a spindle nut lock ring that engages the spindle nut; and
a hubcap that is bolted to the hub, wherein the hubcap is located outboard from the spindle nut in a lateral direction of the apparatus.

2. The apparatus as set forth in claim 1, further comprising:
a pressure source that is in communication with the chamber through the first port, wherein the pressure source provides the pressurized fluid to the chamber; and
a collection vessel that is in communication with the chamber through the second port, wherein the lubricant is forced out of the chamber by the pressurized fluid and through the second port and into the collection vessel.

3. The apparatus as set forth in claim 2, wherein the pressure source has a pressure source fitting that is disposed within the first port, and wherein the collection vessel has a collection vessel fitting that is disposed within the second port.

4. The apparatus as set forth in claim 1, wherein the lubricant engages and lubricates the first bearing and the second bearing.

5. The apparatus as set forth in claim 1, further comprising:
a seal, wherein the seal engages the spindle sleeve and the hub;
wherein the chamber is defined by the hub, the spindle sleeve, the seal, and the containment seal.

6. The apparatus as set forth in claim 1, wherein the lubricant is selected from the group consisting of oil, grease, semi-fluid grease, and synthetic semi-fluid grease.

7. The apparatus as set forth in claim 1, wherein the pressurized fluid is pressurized and introduced to the chamber at a pressure that is higher than a pressure of the chamber.

8. The apparatus as set forth in claim 1, wherein the pressurized fluid is air.

9. The apparatus as set forth in claim 1, wherein the wall of the hub extends 360 degrees around the hub axis, wherein the first port is oriented at an angle of 180 degrees to the second port about the hub axis, wherein the first port is located above the second port in a vertical direction of the apparatus when the pressurized fluid is introduced into the chamber and the lubricant is forced out of the chamber.

10. The apparatus as set forth in claim 1, further comprising:
- a retainer that is disposed within a groove on the outer surface of the spindle sleeve.

\* \* \* \* \*